US007237409B2

(12) United States Patent
Lin

(10) Patent No.: US 7,237,409 B2
(45) Date of Patent: Jul. 3, 2007

(54) STEAM CLEANER WITH SAFETY DEVICE

(75) Inventor: Yu-Yuan Lin, Tainan (TW)

(73) Assignee: Uni-Splendor Corp, Tainan (TW)

( * ) Notice: Subject to any disclaimer, the term of this patent is extended or adjusted under 35 U.S.C. 154(b) by 561 days.

(21) Appl. No.: 10/867,920

(22) Filed: Jun. 15, 2004

(65) Prior Publication Data

US 2005/0274403 A1 Dec. 15, 2005

(51) Int. Cl.
*D06F 75/00* (2006.01)
*F16K 7/00* (2006.01)

(52) U.S. Cl. ........................ 68/222; 137/392; 137/535; 392/404

(58) Field of Classification Search ................ 134/150; 68/222; 137/510, 315.04, 392; 15/320; 392/404; 220/203.23
See application file for complete search history.

(56) References Cited

U.S. PATENT DOCUMENTS

2003/0024574 A1 * 2/2003 Tsen ........................... 137/510

* cited by examiner

*Primary Examiner*—Michael Barr
*Assistant Examiner*—Jason P. Riggleman
(74) *Attorney, Agent, or Firm*—Alan Kamrath; Kamrath & Associates PA

(57) ABSTRACT

A safety valve mounted in a steam cleaner is provided. The safety valve comprises a cap assembly, an actuation assembly, and a lock assembly. A rotation of the cap is adapted to detach the cap assembly when the steam cleaner is not operating or steam pressure inside the steam cleaner has not reach a safety value since the legs of the clutch are engaged with the notches of the driving disk. Responsive to generated steam reaching the safety value, the steam passes through the valve to lift the pushing member for compressing both the actuating member and the spring and disengaging the legs from the notches prior to exiting the steam cleaner such that rotating the cap will not rotate the lock assembly.

3 Claims, 4 Drawing Sheets

STEAM CLEANER WITH SAFETY DEVICE

FIELD OF THE INVENTION

The present invention relates to steam cleaners and more particularly to such a steam cleaner having an improved safety valve for automatically regulating the pressure of the steam chamber thereof so as to prevent steam from rushing out of the nozzle accidentally.

BACKGROUND OF THE INVENTION

U.S. patent application Publication Ser. No. 2003/0024574 A1 to Tsen discloses a safety valve for steam cleaner. When steam is generated in the steam chamber by heating, the pressurized steam passes through the air inlet 112 of the valve body 11 and the center through hole 121 of the valve tube 12 into the air chamber 1621 of the actuating member 16 to expand the diaphragm 162 and to further force the push rod 163 upward, thereby causing the push rod 163 to lift the clutch member 17 upwardly away from the driving disk 15. After disengagement of the legs 172 of the clutch member 17 from the peripheral notches 151 of the driving disk 15, the rotary motion of the cap 18 does not drive the valve body 11 to rotate, i.e., removing the safety valve 1 is impossible. When inside pressure of the steam chamber 21 surpasses the spring power of the compression spring 124, the valve tube 12 is forced upwards from the air inlet 112 of the valve body 11 against the compression spring 124, enabling steam to pass through the air inlet 113 to outside of the steam cleaner 2, keeping inside pressure of the steam chamber 21 below the safety range. As a result, it is possible of preventing steam from rushing out of the steam cleaner 2 accidentally. Thus, continuing improvements in the exploitation of safety device for steam cleaner are constantly being sought.

SUMMARY OF THE INVENTION

It is an object of the present invention to provide a safety valve mounted in a steam cleaner, comprising a cap assembly comprising a rotary cap, a cylindrical clutch including a top short protrusion, a bottom cavity, and a plurality of legs on a bottom periphery, and a first spring having a lower portion put on and anchored by the protrusion so as to be biased in a chamber of the cap; an actuation assembly comprising a hollow, cylindrical seat having external threads, a flexible actuating member having a central through hole and an annular bottom ridge, a shroud having internal threads threadedly secured to the seat and a top central hole, a top of the shroud being urged against the bottom cavity of the clutch and the actuating member being fastened therein, and a pushing member including a top push rod inserted through the hole of the actuating member and the hole of the shroud to be in contact with the bottom cavity of the clutch, and an annular groove matingly engaged with the ridge; and a lock assembly comprising a cylindrical base including a central opening confined by an annular flange, the base being threadedly secured to the cap, a hollow driving disk including a central hole, a plurality of peripheral notches with each leg being snugly inserted thereinto, and two opposite tabs provided on an edge of the central hole thereof, a hollow cylinder including a top annular flange having two opposite slots with the tabs fitted therein for coupling the cylinder to the driving disk, upper internal threads, and lower external threads, a hollow valve including an externally threaded top extension threadedly secured to the seat, and a lower extension seated on an internal shoulder of the cylinder, an externally threaded sleeve threadedly secured to the internal threads, and a second spring compressed between the sleeve and a lower annular flange of the valve; wherein a rotation of the cap is adapted to detach the cap assembly when the steam cleaner is not operating or steam pressure inside the steam cleaner has not reach a predetermined safety value; and responsive to generated steam reaching the predetermined safety value, the steam passes through the valve to lift the pushing member for compressing both the actuating member and the first spring and disengaging the legs from the notches prior to exiting the steam cleaner such that rotating the cap will not cause the lock assembly to rotate. By utilizing the present invention, it is possible of preventing a user from accidentally removing the cap by rotation when the pressurized steam is being generated in the steam cleaner.

The above and other objects, features and advantages of the present invention will become apparent from the following detailed description taken with the accompanying drawings.

DETAILED DESCRIPTION OF THE PREFERRED EMBODIMENTS

Figure 1:
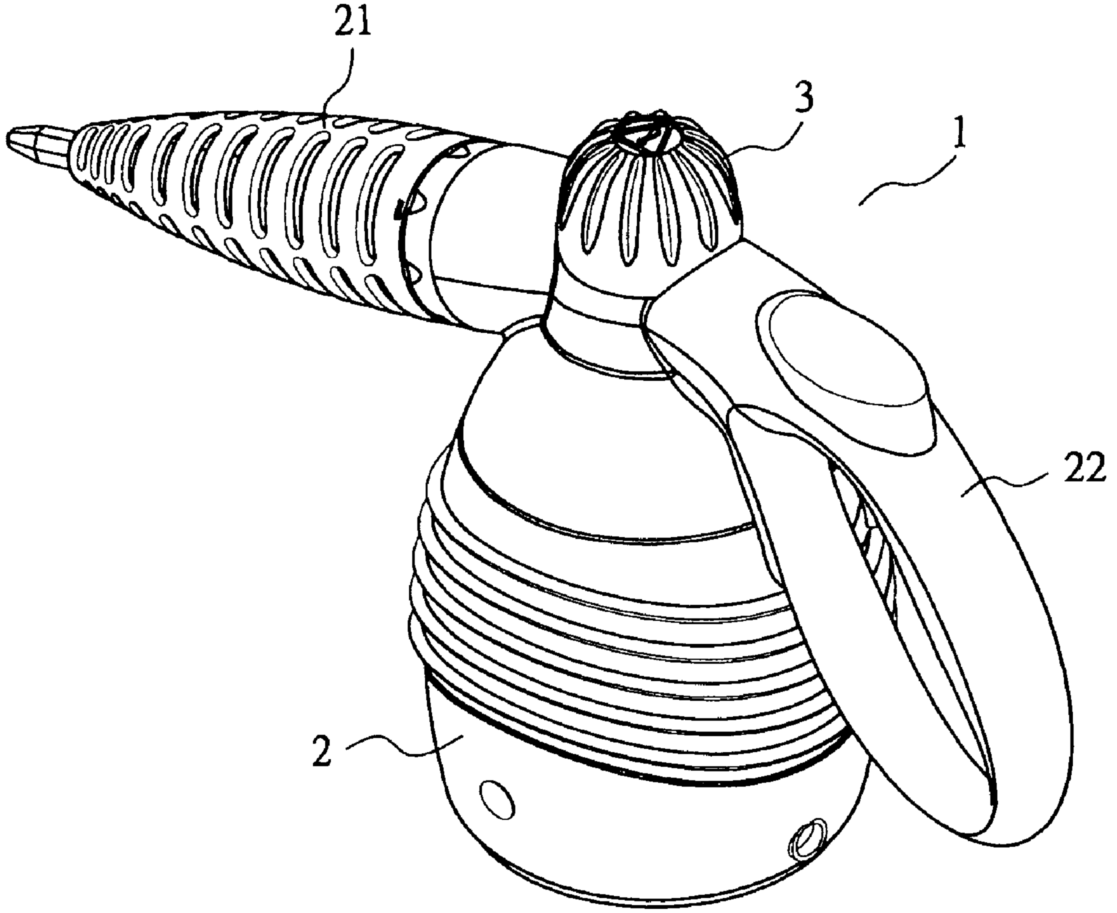
FIG. 1 is a perspective view of a steam cleaner having a safety valve according to the invention mounted therein.
Figure 2:
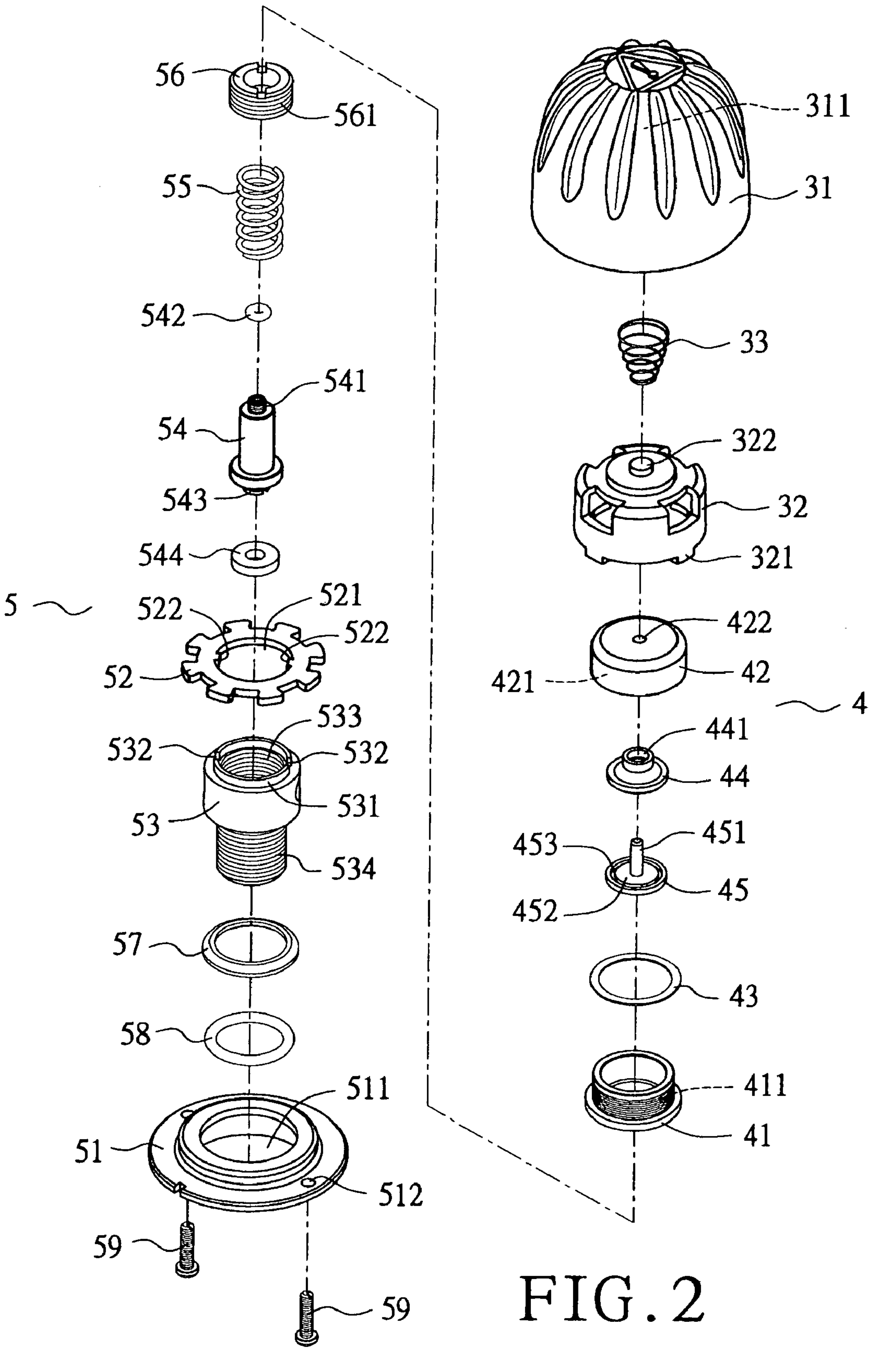
FIG. 2 is an exploded view of the safety valve.
Figure 3:
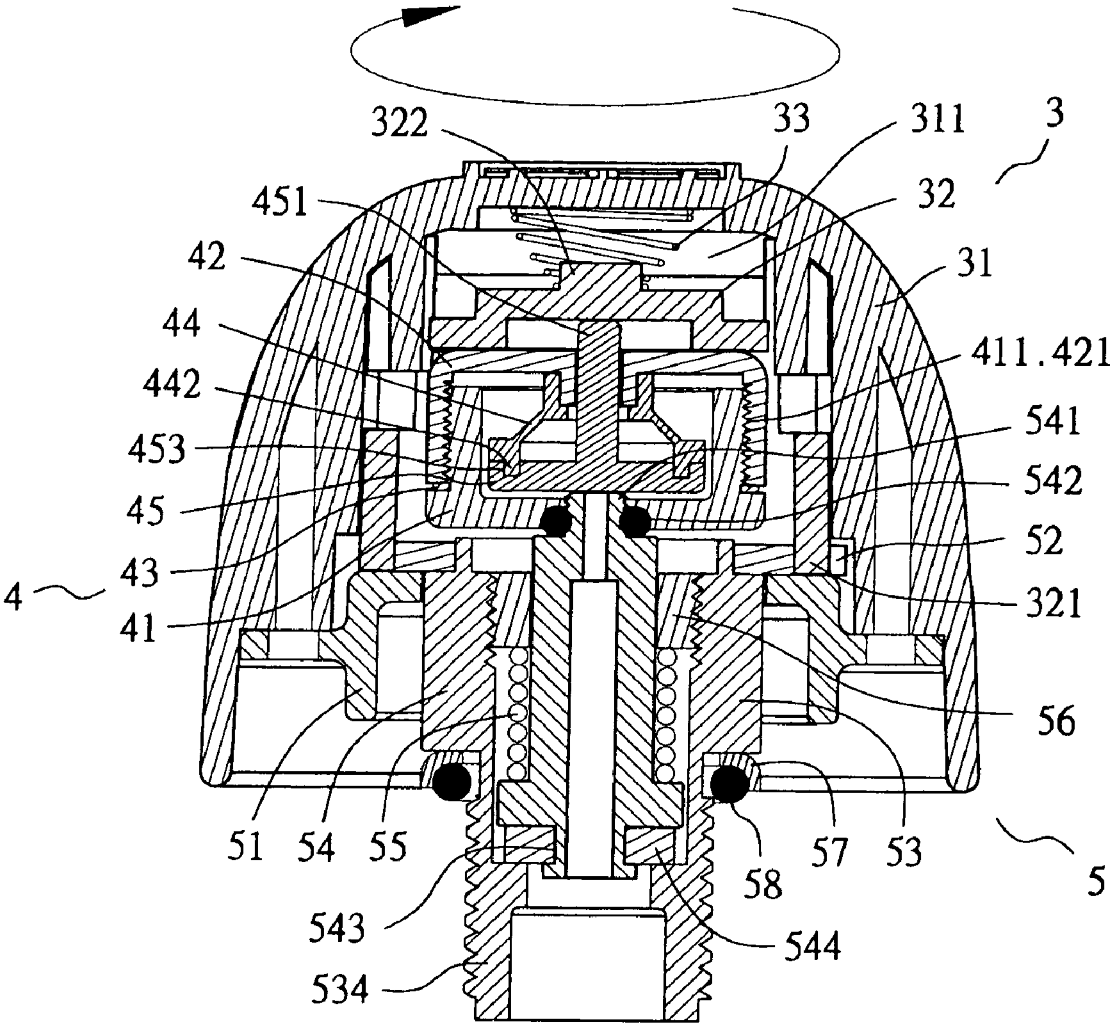
FIG. 3 is a sectional view of the assembled safety valve, where the cap is rotatable when steam pressure inside the steam cleaner has not reached a safety value.

Referring to FIGS. 1, 2 and 3, there is shown a steam cleaner 1 constructed in accordance with the invention comprising a steam chamber 2, a nozzle 21, a handle 22, and a safety valve comprising a cap assembly 3, an actuation assembly 4, and a lock assembly 5. The safety valve as the subject of the invention will be described in detail below.

The cap assembly 3 comprises a rotary cap 31, a cylindrical clutch 32 including a top short protrusion 322 and a plurality of legs 321 on a bottom periphery, and a first spring 33 having a lower portion put on and anchored by the protrusion 322 so as to be biased in a chamber 311 of the cap 31.

The actuation assembly 4 comprises a hollow, cylindrical seat 41 having external threads 411, a washer 43 seated on an annular bottom flange of the seat 41, a flexible actuating member 44 having a central through hole 441 and an annular bottom ridge 442, a shroud 42 having internal threads 421 threadedly secured to the seat 41 with the washer 43 compressed thereunder, and a top central hole 422, the top of the shroud 42 being urged against a bottom cavity of the clutch 32 and the actuating member 44 being fastened therein, and a pushing member 45 including a top push rod 451 inserted through the holes 441 and 422 to be in contact with the bottom cavity of the clutch 32, a base 452, and an annular groove 453 provided on the base 452 matingly engaged with the ridge 442.

The lock assembly 5 comprises a cylindrical base 51 including a central opening 511 confined by an annular flange, and a plurality of peripheral holes 512 so that a plurality of screws 59 can be driven through the holes 512 into the cap 31 for securing thereto, a hollow driving disk 52 including a central hole 521, a plurality of peripheral notches 52 with each leg 321 being snugly inserted thereinto, and two opposite tabs 522 provided on the edge of the hole 521, a hollow cylinder 53 including a top annular flange 531 having two opposite slots 532 with the tabs 522 fitted therein for coupling the cylinder 53 to the driving disk 52, internal threads 533 provided in an upper portion, and external threads 534 provided in a lower portion, a hollow valve 54 including an externally threaded top extension 541 inserted through an O-ring 542 into an internally threaded bottom hole of the seat 41 to be threadedly thereto, and a lower extension 543 with a buffer ring 544 sleeved on a narrow portion thereof and seated on an internal shoulder of the cylinder 53, a sleeve 56 having external threads 561 threadedly secured to the internal threads 533, a second spring 55 compressed between the sleeve 56 and a lower annular flange of the valve 54, a ring 57 provided on an underside of an intermediate portion of the cylinder 53, and an O-ring 58 biased between the ring 57 and the top of the external threads 534.

In an assembled state of the safety valve the cap assembly 3 and the lock assembly 5 are fastened together since as stated above the legs 321 are anchored in the notches 52 (see FIG. 3). Thus, a user may clockwise rotate the cap 31 as indicated by arrow to detach the cap assembly 3, the actuation assembly 4, and the lock assembly 5 when the steam cleaner 1 is not operating or steam pressure inside the steam chamber of the steam cleaner has not reach a safety value.

Figure 4:
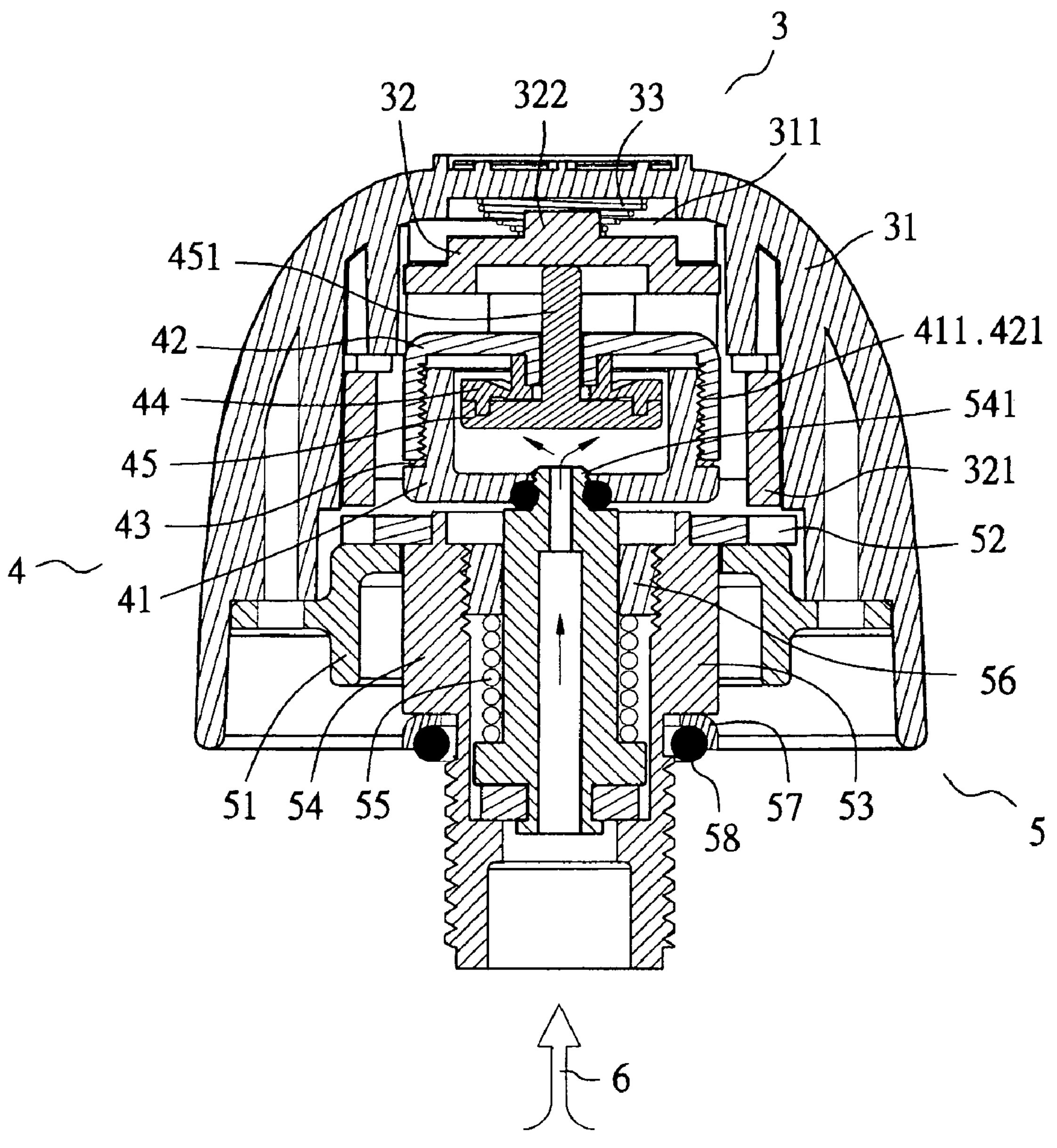
FIG. 4 is a view similar to FIG. 3, where the rotation of the cap will not disconnect the cap assembly from the steam cleaner when the internal steam pressure surpasses the spring power of the first spring.

Referring to FIG. 4, when steam 6 is generated in the steam chamber of the steam cleaner 1 by heating and the pressurized steam 6 has reached the safety value, the pressurized steam 6 passes through the internal passage of the valve 54 (as indicated by arrow) to lift the pushing member 45 for compressing both the actuating member 44 and the first spring 33 and thus disengaging the legs 321 from the notches 52 prior to exiting the steam chamber 2 through the nozzle 21. After disengagement of the legs 321 from the notches 52, the rotary motion of the cap 31 does not drive the lock assembly 5 to rotate, i.e., removing the cap assembly 3 and thus the lock assembly 5 being impossible. This can prevent a user from accidentally removing the cap 31 by rotation when pressurized steam is being generated in the steam cleaner 1. Once the steam cleaner 1 is not operating or steam pressure inside the steam cleaner 1 has not reached the safety value, the pushing member 45 will lower to its nonoperating position (see FIG. 3) due to the expansion of the first spring 33. Also, the legs 321 engage with the notches 52 again for coupling the cap assembly 3 and the lock assembly 5 together.

While the invention herein disclosed has been described by means of specific embodiments, numerous modifications and variations could be made thereto by those skilled in the art without departing from the scope and spirit of the invention set forth in the claims.

What is claimed is:

1. A safety device mounted in a steam cleaner, comprising:

a cap assembly comprising a rotary cap, a cylindrical clutch including a top short protrusion, a bottom cavity, and a plurality of legs on a bottom periphery, and a first spring having a lower portion put on and anchored by the protrusion so as to be biased in a chamber of the cap;

an actuation assembly comprising a hollow, cylindrical seat having external threads, a flexible actuating member having a central through hole and an annular bottom ridge, a shroud having internal threads threadedly secured to the seat and a top central hole, a top of the shroud being urged against the bottom cavity of the clutch and the actuating member being fastened therein, and a pushing member including a top push rod inserted through the hole of the actuating member and the hole of the shroud to be in contact with the bottom cavity of the clutch, and an annular groove matingly engaged with the ridge; and a lock assembly comprising a cylindrical base including a central opening confined by an annular flange, the base being threadedly secured to the cap, a hollow driving disk including a central hole, a plurality of peripheral notches with each leg being snugly inserted thereinto, and two opposite tabs provided on an edge of the central hole thereof, a hollow cylinder including a top annular flange having two opposite slots with the tabs fitted therein for coupling the cylinder to the driving disk, upper internal threads, and lower external threads, a hollow valve including an externally threaded top extension threadedly secured to the seat, and a lower extension seated on an internal shoulder of the cylinder, an externally threaded sleeve threadedly secured to the internal threads, and a second spring compressed between the sleeve and a lower annular flange of the valve; wherein a rotation of the cap is adapted to detach the cap assembly when the steam cleaner is not operating or steam pressure inside the steam cleaner has not reach a predetermined safety value; and responsive to generated steam reaching the predetermined safety value, the steam passes through the valve to lift the pushing member for compressing both the actuating member and the first spring and disengaging the legs from the notches prior to exiting the steam cleaner such that rotating the cap will not cause the lock assembly to rotate.

2. The safety device of claim 1, further comprising a ring provided on an underside of an intermediate portion of the cylinder, and an O-ring biased between the ring and a top of the external threads of the cylinder.

3. The safety device of claim 1, further comprising a buffer ring sleeved on a narrow portion of the lower extension of the valve and seated on an internal shoulder of the cylinder.

* * * * *